United States Patent
Paffenholz (10) Patent No.: US 7,630,276 B2
(45) Date of Patent: Dec. 8, 2009

(54) METHOD FOR DETERMINATION OF DIFFERENTIAL TRANSFER FUNCTION BETWEEN TWO CLOSELY SPACED HYDROPHONES

(75) Inventor: Josef Paffenholz, Missouri City, TX (US)

(73) Assignee: Fairfield Industries Incorporated, Sugar Land, TX (US)

( * ) Notice: Subject to any disclaimer, the term of this patent is extended or adjusted under 35 U.S.C. 154(b) by 0 days.

(21) Appl. No.: 12/057,036

(22) Filed: Mar. 27, 2008

(65) Prior Publication Data

US 2009/0245020 A1    Oct. 1, 2009

(51) Int. Cl.
    *G01V 1/38*    (2006.01)
(52) U.S. Cl. ......................................................... 367/21
(58) Field of Classification Search ................... 367/15, 367/20–24
    See application file for complete search history.

(56) References Cited

U.S. PATENT DOCUMENTS

| 4,937,793 | A | * | 6/1990 | Shuck et al. .................. 367/24 |
| 5,051,960 | A | * | 9/1991 | Levin ........................... 367/24 |
| 7,319,636 | B2 | * | 1/2008 | Robertsson et al. ........... 367/21 |
| 7,489,590 | B2 | * | 2/2009 | Grion ........................... 367/24 |

OTHER PUBLICATIONS

Mehta et al. "Strengthening the virtual-source method for time-lapse monitoring," Geophysics, vol. 73, No. 3, May-Jun. 2008, pp. S73-S80.*
David J. Monk, "Wavefield separation of twin streamer data," First Break, Mar. 1990 vol. 8(3): pp. 96-104.
Lars Sonnenland et al, "2-D Deghosting Using Vertical Receiver Arrays," 56th Annual International Meeting, Soc. Expl. Geophys., 1986 Houston pp. 516-519.

* cited by examiner

*Primary Examiner*—Jack W. Keith
*Assistant Examiner*—Krystine Saito
(74) *Attorney, Agent, or Firm*—Patterson & Sheridan, LLP (57) ABSTRACT

Methods and apparatus for determining an accurate differential transfer function (DTF) between two closely spaced hydrophones in a dual-hydrophone configuration such that the wavefield may be properly separated into up- and down-going components are provided. The methods disclosed herein are based on the premise that the cross-correlation at a lag of zero between up- and down-going wavefields should be at a minimum for perfectly matched hydrophones. Thus, any suitable global optimization technique may be utilized to determine an accurate DTF where the zero-lag cross-correlation between up- and down-going energy is at a minimum after multiplying a particular hydrophone spectrum of the pair (depending on how the DTF was defined) with a possible DTF suggested by the global optimization technique.

15 Claims, 7 Drawing Sheets

METHOD FOR DETERMINATION OF DIFFERENTIAL TRANSFER FUNCTION BETWEEN TWO CLOSELY SPACED HYDROPHONES

BACKGROUND OF THE INVENTION

1. Field of the Invention

Embodiments of the present invention generally relate to techniques for processing seismic data and, more particularly, to determining an accurate differential transfer function (DTF) between two closely spaced hydrophones in an effort to properly separate the wavefield into up- and down-going components.

2. Description of the Related Art

In the oil and gas industry, seismic surveys are one of the most important techniques for discovering the presence of subterranean hydrocarbon deposits. If the data is properly processed and interpreted, a seismic survey can provide geologists with a two-dimensional (2-D) or three-dimensional (3-D) representation of subsurface lithologic formations and other features, so that they may better identify those formations likely to contain oil and/or gas. Having an accurate representation of an area's subsurface lithologic formations can increase the odds of hitting an economically recoverable reservoir when drilling and decrease the odds of wasting money and effort on a nonproductive well.

A seismic survey is conducted by deploying an array of energy sources and an array of receivers in an area of interest. Typically, vibrator trucks are used as sources for land surveys, and air guns are used for marine surveys. The sources are discharged in a predetermined sequence, sending a down-going seismic wavefield or signal into the earth that is partially reflected by subsurface seismic reflectors (i.e., interfaces between subsurface lithologic or fluid units having different elastic properties). The reflected or up-going wavefield or signals (known as "seismic reflections") are then detected and converted to electrical signals by the array of receivers located at or near the surface of the earth, at or near the water surface, or at or near the seafloor.

Each receiver records the amplitude of the incoming signals over time at the receiver's particular location, thereby generating a seismic survey of the subsurface. The seismic energy recorded by each seismic receiver for each source activation during data acquisition is generally referred to as a "trace." Since the physical location of the sources and receivers is known, the time it takes for a reflection wave to travel from a source to a sensor is directly related to the depth of the formation that caused the reflection. Thus, the recorded signals, or seismic energy data, from the array of receivers can be analyzed to yield valuable information about the depth and arrangement of the subsurface formations, some of which hopefully contain oil or gas accumulations.

This analysis typically begins by organizing the data from the array of receivers into common geometry gathers, where data from a number of receivers that share a common geometry are analyzed together. A gather will provide information about a particular location or profile in the area being surveyed. Ultimately, the data will be organized into many different gathers and processed before the analysis is completed in an effort to map the entire survey area. The types of gathers typically employed include common midpoint (i.e., the receivers and their respective sources share a common midpoint), common source (i.e., the receivers share a common source), common offset (i.e., the receivers and their respective sources have the same separation or "offset"), and common receiver (i.e., a number of sources share a common receiver).

The data in a gather is typically recorded or first assembled in the time-offset domain. That is, the seismic traces recorded in the gather are assembled or displayed together as a function of offset (i.e., the distance of the receiver from a reference point) and of time. The time required for a given signal to reach and be detected by successive receivers is a function of its velocity and the distance traveled. Those functions are referred to as kinematic travel time trajectories. Thus, at least in theory, when the gathered data is displayed in the time-offset domain (the T-X domain), the amplitude peaks corresponding to reflection signals detected at the receivers should align into patterns that mirror the kinematic travel time trajectories. It is from those trajectories that one ultimately may determine an estimate of the depths at which formations exist.

The seismic receivers utilized in such operations typically include pressure sensors, such as hydrophones, and velocity sensors, such as single or multi-component geophones. The combination of a hydrophone and a vertical geophone to form a dual-sensor has long been used as a technique for attenuating ghost reflections from the air-water interface. The fundamental concept is that up-going and down-going waves are measured differently by a velocity sensor, while direction of progression of the wave has no polarity significance to the hydrophone. However, in some situations the geophone signals from dual-sensor recording are quite noisy due to interface waves in the muddy water bottom. In such cases, the use of pairs of vertically separated hydrophones (dual-hydrophone setups) deployed some meters above the water bottom would present clear advantages in ocean bottom operations. In streamer operation, use of dual-hydrophones would enable the elimination of the receiver ghost from the surface. Therefore, dual-hydrophone cables could be towed at a much larger depth, which widens the operational window considerably and enables the capture of lower frequencies.

Such a pair of vertically separated hydrophones disposed in a water layer can be used to separate the wavefield into up- and down-going components. The information needed to perform the separation is encoded into the difference signal between the two hydrophones, and the established practice is to have a separation distance of at least several meters. However, the use of closely spaced dual-hydrophones with a vertical separation distance of 1 m or less has obvious operational advantages over setups with several meters of vertical separation. For example, the closely spaced hydrophones could be built into a single housing and deployed much more easily than paired hydrophones separated by several meters. However, there are problems associated with processing data from closely spaced dual-hydrophones.

Accordingly, what is needed is an improved method of processing dual-hydrophone data such that meaningful seismic data may be extracted, especially for pairs of closely spaced hydrophones.

SUMMARY OF THE INVENTION

Embodiments of the present invention provide techniques for processing dual-hydrophone seismic data by determining an accurate differential transfer function (DTF) between two closely spaced hydrophones such that the wavefield may be properly separated into up- and down-going components.

One embodiment of the present invention is a method of processing seismic data from first and second hydrophones. The method generally includes using a global optimization technique to generate a plurality of possible DTFs and determine a suitable DTF between the first and second hydrophones based on a cross-correlation between a first absolute value of an up-going portion of a product resulting from multiplying a spectrum of the second hydrophone with one of the plurality of possible DTFs and a second absolute value of a down-going portion of the product; and separating a wavefield from one of the first and second hydrophones into an up-going element and a down-going element based on the suitable DTF.

Another embodiment of the present invention is a method for determining a suitable DTF between first and second hydrophones. The method generally includes (a) determining a plurality of possible DTFs based on corresponding trace pairs from the first and second hydrophones; (b) generating a product by applying one of the plurality of possible DTFs to one trace of a portion of the trace pairs, the one trace being from the second hydrophone; (c) separating the product into an up-going component and a down-going component; (d) calculating a cross-correlation between absolute values of the up-going and down-going components; (e) repeating steps (b) through (d) for each trace pair in the portion of the trace pairs; (f) summing the cross-correlations for all the trace pairs in the portion of the trace pairs; (g) repeating steps (b) through (f) for each possible DTF in the plurality of possible DTFs; and (h) selecting the suitable DTF from the plurality of possible DTFs based on the summed cross-correlations.

Yet another embodiment of the present invention provides a computer-readable medium containing a program for determining a suitable DTF between first and second hydrophones, which, when executed by a processor, performs certain operations. The operations generally include (a) determining a plurality of possible DTFs based on corresponding trace pairs from the first and second hydrophones; (b) generating a product by applying one of the plurality of possible DTFs to one trace of a portion of the trace pairs, the one trace being from the second hydrophone; (c) separating the product into an up-going component and a down-going component; (d) calculating a cross-correlation between absolute values of the up-going and down-going components; (e) repeating steps (b) through (d) for each trace pair in the portion of the trace pairs; (f) summing the cross-correlations for all the trace pairs in the portion of the trace pairs; (g) repeating steps (b) through (f) for each possible DTF in the plurality of possible DTFs; and (h) selecting the suitable DTF from the plurality of possible DTFs based on the summed cross-correlations.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the present invention provide methods and apparatus for determining an accurate differential transfer function (DTF) between two closely spaced hydrophones in a dual-hydrophone configuration such that the wavefield may be properly separated into up- and down-going components. The methods disclosed herein are based on the premise that the cross-correlation at a lag of zero between up- and down-going wavefields should be at a minimum for perfectly matched hydrophones. Thus, any suitable global optimization technique may be utilized to determine an accurate DTF where the zero-lag cross-correlation between up- and down-going energy is at a minimum after multiplying a particular hydrophone spectrum of the pair (depending on how the DTF was defined) with a possible DTF suggested by the global optimization technique. As used herein for signal processing, the cross-correlation is generally defined as a measure of the similarity between two signals and involves shifting the first signal and multiplying it with the second signal.

Some or all of the steps of the methods disclosed herein may be performed on any suitable computing system, such as a personal computer (PC), a network server, or a supercomputer, as those skilled in the art will recognize. The steps of the methods described in connection with the present disclosure may be embodied directly in hardware, in a software module executed by a processor, or in a combination of the two. A software module may reside in any form of storage medium that is known in the art. Some examples of storage media that may be used include random access memory (RAM), read-only memory (ROM), flash memory, an EPROM (erasable ROM), an EEPROM (electrically erasable ROM), registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

An Exemplary Method for Determining a Dual-Hydrophone DTF

If the frequency response of two closely vertically spaced hydrophones is not identical, the resulting wavefield separation into up- and down-going parts may be significantly impacted. The main effect is that the down-going part still contains up-going energy and vice versa. This considerable distortion and degradation of the wavefield separation may arise when differences in the transfer functions between the upper and lower hydrophones exceed the magnitude of the signal differences between the hydrophones. Therefore, in order to use and extract meaningful data from closely spaced dual-hydrophones, the DTF between the two hydrophones may most likely need to be known or determined to a high degree of accuracy. Although the frequency response of each of the hydrophones or the DTF may be determined by the manufacturer or may be calibrated by the operator some time before use, hydrophone transfer functions may change with time (i.e., long-term drift), temperature, pressure, and other environmental variables. Thus, as an advantage over conventional techniques, the method disclosed herein provides a means to determine the DTF from the seismic data collected by the dual-hydrophones, rather than from a fixed table or other static value.

Figure 1:
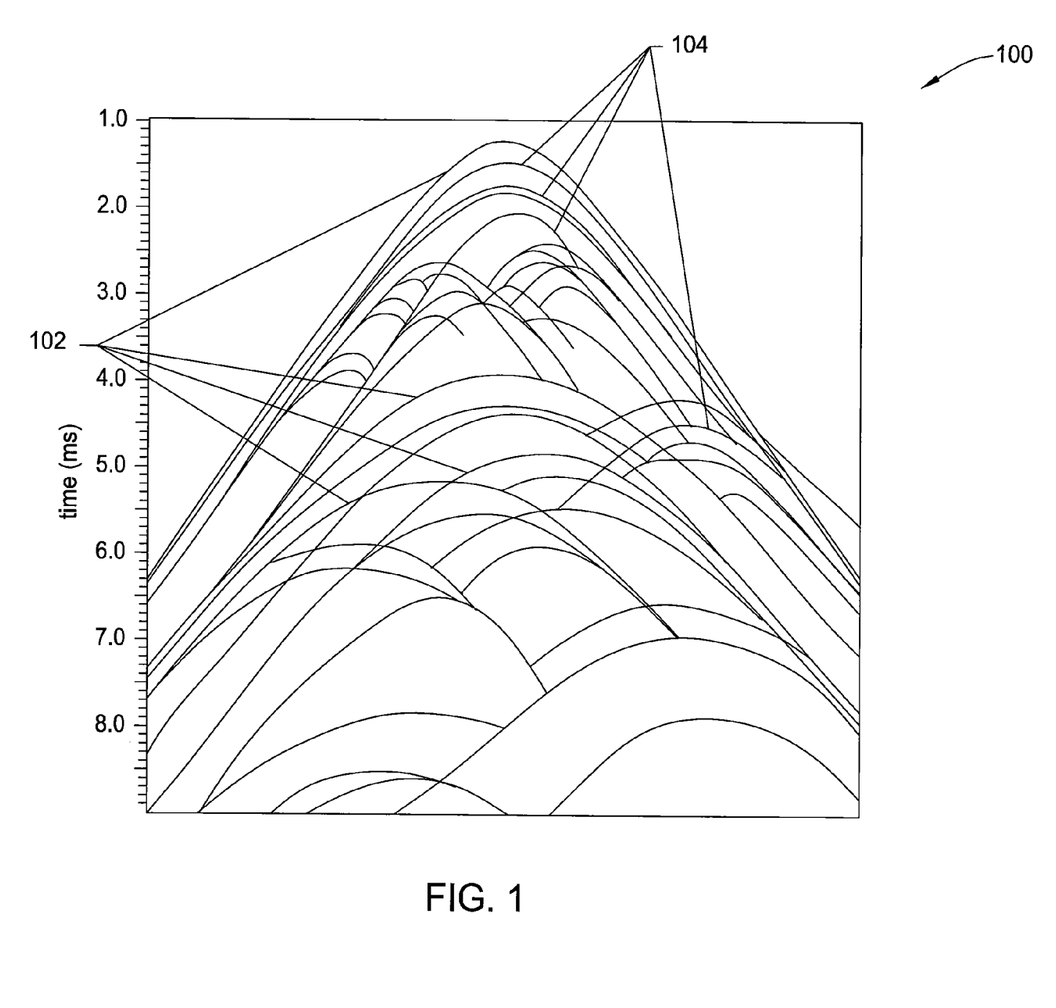
FIG. 1 illustrates a common receiver gather for the upper hydrophone in a dual-hydrophone configuration, wherein the upper and lower hydrophones have different frequency responses in accordance with an embodiment of the present invention.

FIG. 1 illustrates a common receiver gather 100 for the upper hydrophone in a dual-hydrophone configuration, wherein the upper and lower hydrophones have different frequency responses. The gather 100 of FIG. 1 contains both down-going energy 102 and up-going energy 104. As an example, the traces that compose the gather 100 will be processed to determine an accurate DTF for the dual-hydrophone configuration as described below.

Figure 2:
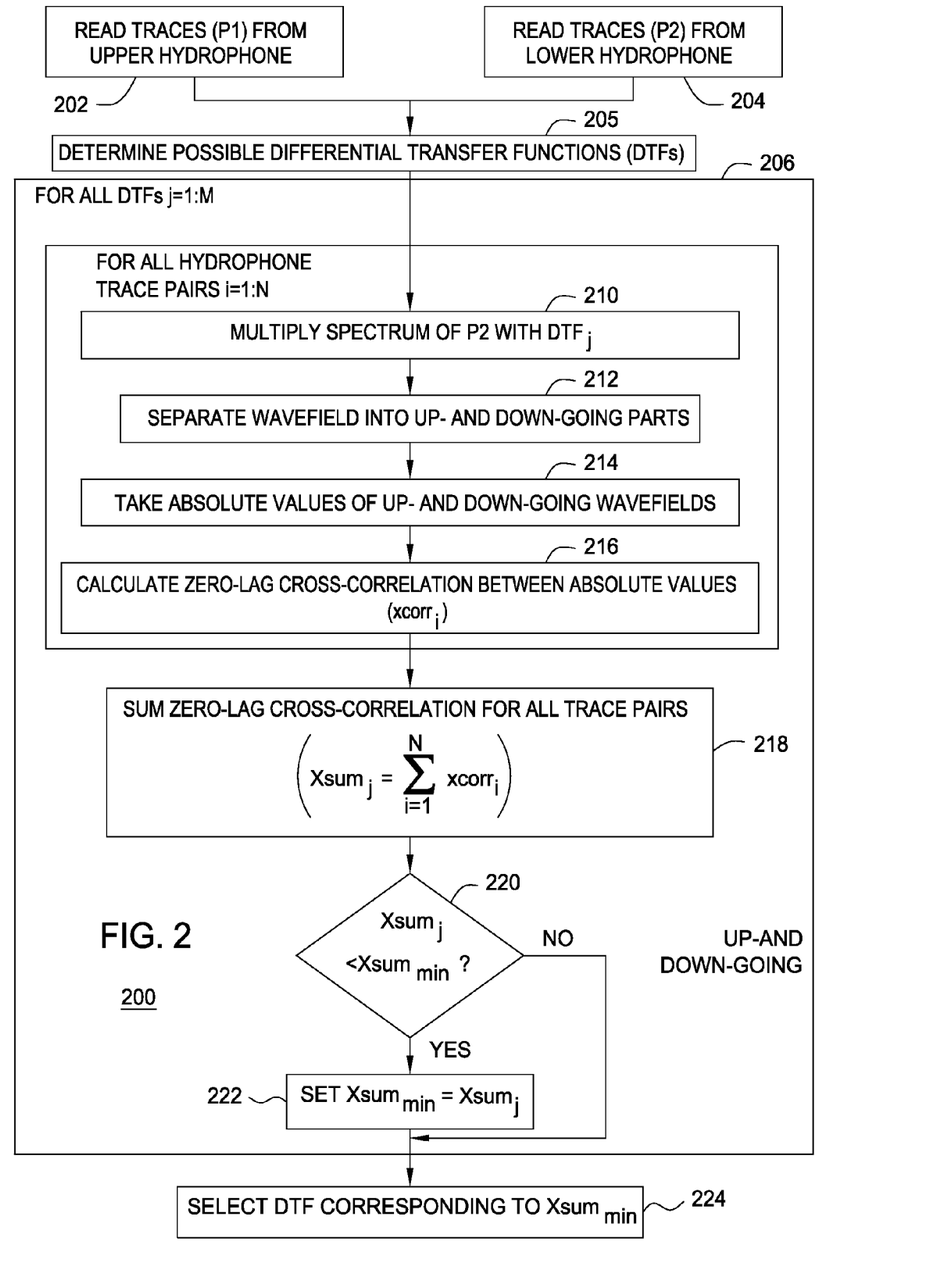
FIG. 2 is a flow diagram illustrating exemplary operations for determining an accurate differential transfer function (DTF) between a pair of vertically separated hydrophones in a dual-hydrophone configuration, in accordance with an embodiment of the present invention.

FIG. 2 illustrates a flow diagram 200 of example operations for determining an accurate DTF between a pair of vertically separated hydrophones in a dual-hydrophone configuration. Once an accurate DTF has been determined, the wavefield may be properly separated into up- and down-going components without distortion caused by the different frequency responses of the upper and lower hydrophones. For the example of FIG. 2, the DTF for the vertically separated hydrophones is defined as the transfer function of the upper hydrophone divided by the transfer function of the lower hydrophone.

The operations begin, at step 202, by reading traces (P1) from the upper hydrophone and, at step 204, by reading traces (P2) from the lower hydrophone in the dual-hydrophone configuration. One key to successful operation of closely spaced dual-hydrophones may be the use of high resolution (e.g., 24-bit) recording instruments. Without these, the resolution may not be sufficient to measure the small difference signal between the paired hydrophones.

At step 205, a number of possible DTFs may be determined based on the traces (P1 and P2) collected from the dual-hydrophone and the difference signal between these traces. For some embodiments, determining the possible DTFs may involve assuming that the DTF is a smooth function (i.e., lacking any discontinuities) in both amplitude and phase and generating low-order polynomial (e.g., third-order polynomial) curves for both amplitude and phase to approximate the DTF based on the upper hydrophone traces (P1) and on the lower hydrophone traces (P2). The polynomial curves may be approximated to optimally fit the DTF. The decisions for the order of the curve-fitting polynomial may involve a tradeoff between DTF accuracy and computational speed.

The operations of FIG. 2 assume using an exhaustive search (also known as a brute-force search or exhaustive enumeration) technique to determine and evaluate all possible DTFs in an effort to find the most accurate DTF. However, the operations of FIG. 2 may be modified slightly to utilize any global optimization technique (e.g., simulated annealing or a genetic algorithm) or other appropriate numerical analysis techniques in an effort to find at least a suitable DTF, if not the most accurate DTF, for the dual-hydrophone being evaluated.

Figure 3:
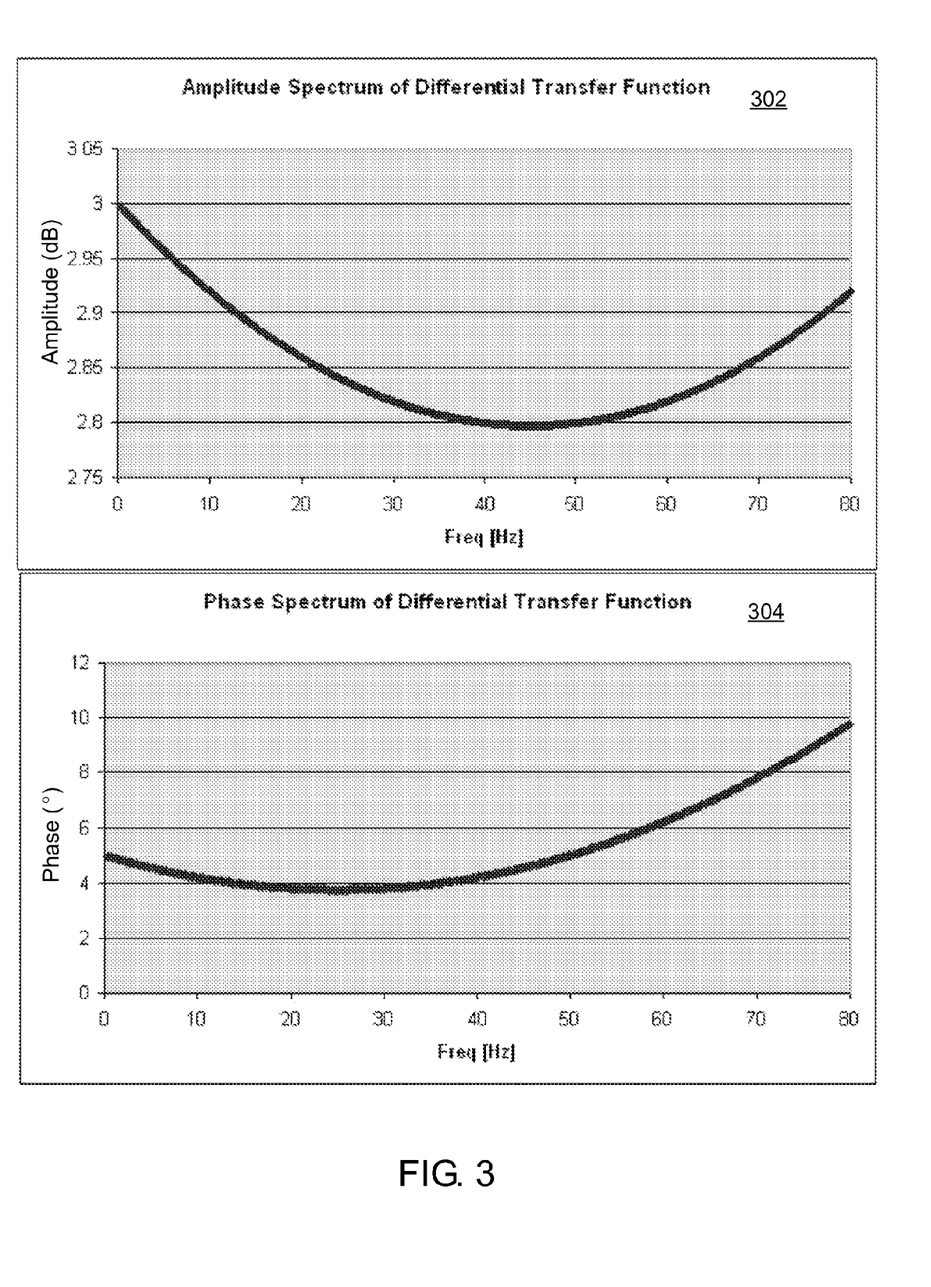
FIG. 3 illustrates an amplitude and phase spectrum of a DTF determined by the flow diagram of FIG. 2, in accordance with an embodiment of the present invention.

FIG. 3 illustrates an amplitude spectrum 302 and a phase spectrum 304 of a possible DTF generated at step 205. As it will turn out, the amplitude and phase spectrums 302, 304 of FIG. 3 will be the accurate DTF between the upper hydrophone gather 100 of FIG. 1 and the lower hydrophone gather (not shown), as determined by the operations of FIG. 2. Although two third-order polynomials were used to generate the amplitude and phase spectrums 302, 304 of FIG. 3, a second-order or higher polynomial function could have been used to approximate the accurate DTF between these two vertically spaced hydrophones.

Referring again to FIG. 2, for each possible DTF (j) out of all the possible DTFs (M) within block 206, a series of operations may be performed within block 208 for one or more selected pairs of traces (P1 and P2) from the upper and lower hydrophones, where i is the current trace pair and N is the total number of selected trace pairs. Using more than one trace pair may increase the signal-to-noise ratio (SNR) when comparing the processed signals to determine the correct DTF among the possible DTFs. The operations within block 208 begin, at step 210, by multiplying a spectrum of the lower hydrophone for the current trace pair (i) with the current possible DTF (j). However, in embodiments where the DTF is defined as the transfer function of the lower hydrophone divided by the transfer function of the upper hydrophone, a spectrum of the upper hydrophone for the current trace pair (i) may be multiplied with the current possible DTF (j) at step 210.

At step 212, the product resulting from the multiplication may be separated into up- and down-going components. This separation may be performed using any suitable wavefield separation technique known by those skilled in the art or as yet undiscovered, such as Fourier transformation, Radon transformation into the time-slowness (tau-P) domain where slowness (p) is the inverse of velocity (p=1/v), median filtering, optimal filtering, frequency-wavenumber (f-k) filtering, Karhunen-Loève (K-L) filtering, and parametric separation. The wavefield separation may be performed in the frequency domain.

Because of the presence of down-going energy in the up-going wavefield and vice versa in the case of different frequency responses between the closely spaced hydrophones, the cross-correlation at a lag of zero between up- and down-going wavefields is larger than it would be for perfectly matched hydrophones (i.e., hydrophones having a differential transfer function of one for all frequencies). This principle may be used to search for the correct DTF by minimizing the zero-lag cross-correlation between up- and down-going energy after multiplying the lower hydrophone spectrum for the current trace pair with the current possible DTF. In order to exclude effects due to different polarities in the up- and down-going components from the cross-correlation, the absolute values of the up- and down-going components may be taken at step 214 after transforming the separated components into the time domain. The zero-lag cross-correlation ($xcorr_i$) for the current trace pair may be calculated from the absolute values at step 216. Although cross-correlation may be performed in the frequency domain, the time domain may be used instead for increased efficiency.

The operations within block 208 may be repeated until N cross-correlations have been calculated for all of the selected trace pairs. If more than one trace pair is used for the DTF determination in an effort to increase the signal-to-noise ratio (SNR), the cross-correlation values ($xcorr_1$ to $xcorr_N$) for all trace pairs may be summed for the current possible DTF (j) at step 218 according to the equation:

$$Xsum_j = \sum_{i=1}^{N} xcorr_i$$

At step 220, if the sum of the cross-correlations for the current possible DTF ($Xsum_j$) is less than the smallest sum of the cross-correlations ($Xsum_{min}$) out of all the possible DTFs that have been evaluated thus far, then $Xsum_{min}$ may be updated to be $Xsum_j$ at step 222. In contrast, if the sum of the cross-correlations for the current possible DTF ($Xsum_j$) is not less than $Xsum_{min}$, then $Xsum_{min}$ may remain unchanged, and the operations within block 206 may repeat for the next possible DTF until all of the possible DTFs have been evaluated. In this manner, once all of the possible DTFs have been evaluated within block 206, $Xsum_{min}$ should have the smallest sum out of all the possible DTFs. Then, at step 224, the possible DTF corresponding to $Xsum_{min}$ may be designated as the correct DTF for the dual-hydrophone and may be used for subsequent seismic data processing including proper wavefield separation without the presence of down-going energy in the up-going wavefield and vice versa.

Rather than designating the possible DTF corresponding to the absolute minimum summed cross-correlation ($Xsum_{min}$) for some embodiments, a possible DTF corresponding to a minimum summed cross-correlation close to the absolute minimum may be designated for use as the DTF for subsequent seismic data processing. Although this DTF value may not be the most accurate DTF, it may be suitable enough.

Figure 4A:
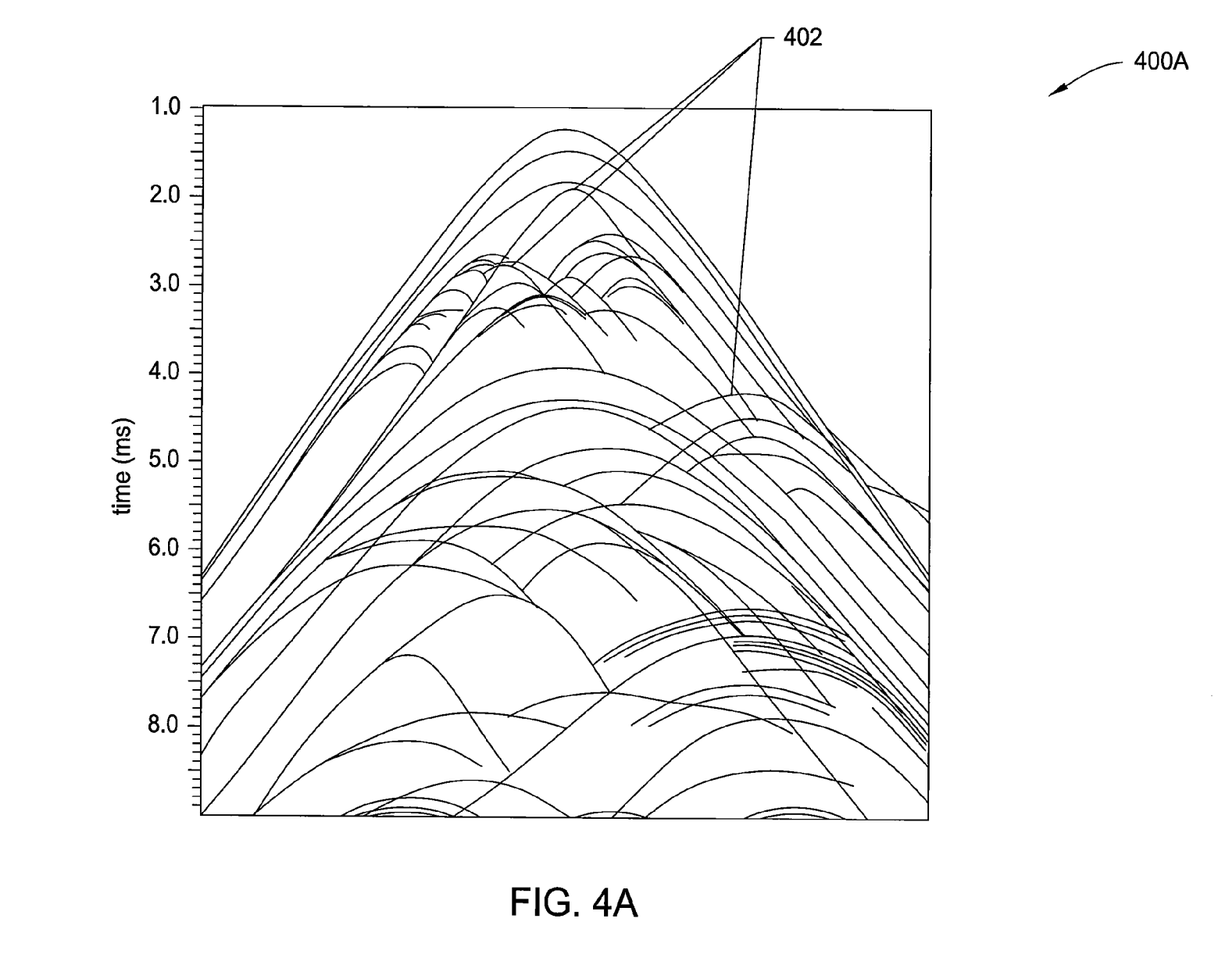
FIG. 4A illustrates a down-going wavefield without DTF correction from the dual-hydrophone configuration of FIG. 1, in accordance with an embodiment of the present invention.

FIG. 4A illustrates a down-going wavefield 400A from the dual-hydrophone configuration employed to generate FIG. 1 that was processed without DTF correction. In other words, the upper and lower hydrophones possess different frequency responses (the DTF amplitude and phase spectra 302, 204 of FIG. 3 in this example), but the DTF between the two hydrophones was not taken into account. The down-going wavefield 400A illustrates the residual up-going energy 402 caused by incomplete wavefield separation.

Figure 5A:
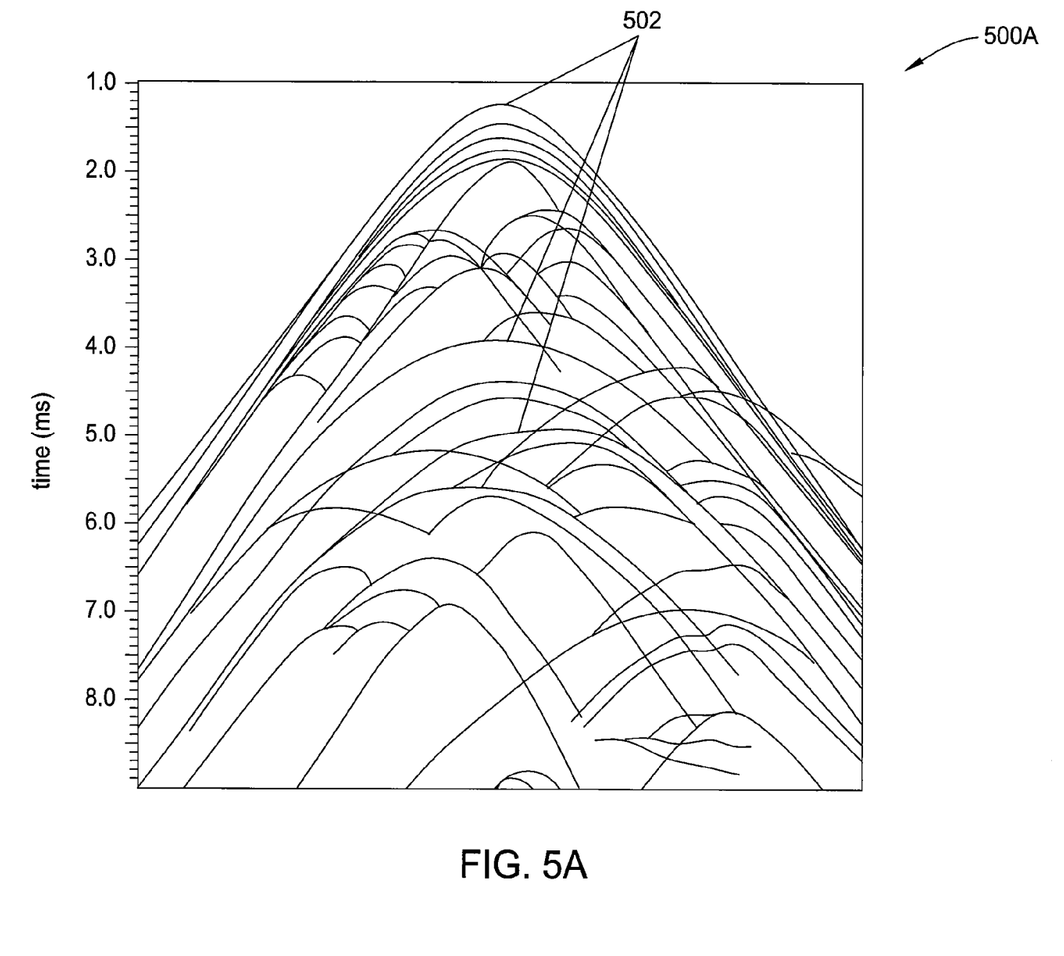
FIG. 5A illustrates an up-going wavefield without DTF correction from the dual-hydrophone configuration of FIG. 1, in accordance with an embodiment of the present invention.

Likewise, FIG. 5A illustrates an up-going wavefield 500 from the dual-hydrophone configuration employed to generate FIG. 1, also without DTF correction. The up-going wavefield 500A illustrates the residual down-going energy 502 due to incomplete wavefield separation.

Figure 4B:
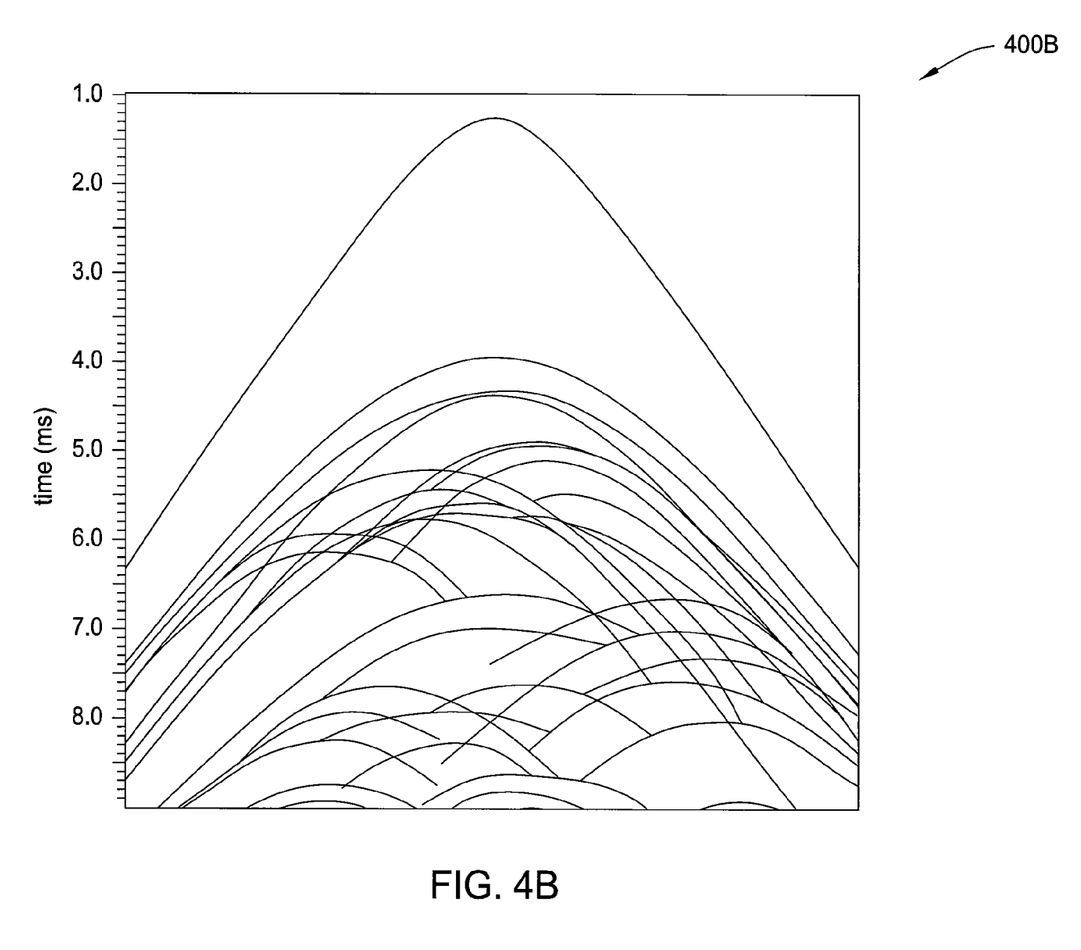
FIG. 4B illustrates the down-going wavefield of FIG. 4A after being corrected with the DTF of FIG. 2, in accordance with an embodiment of the present invention.

FIG. 4B illustrates a down-going wavefield 400B from the dual-hydrophone configuration employed to generate FIG. 1 after being corrected with the DTF of FIG. 3 as determined by the operations in the flow diagram 200 of FIG. 2. In other words, the down-going wavefield 400B corresponds to the down-going wavefield 400A of FIG. 4A, except that to generate FIG. 4B, the separation algorithm used the hydrophone signals corrected with the accurate DTF. The down-going wavefield 400B does not exhibit the residual up-going energy 402.

Figure 5B:
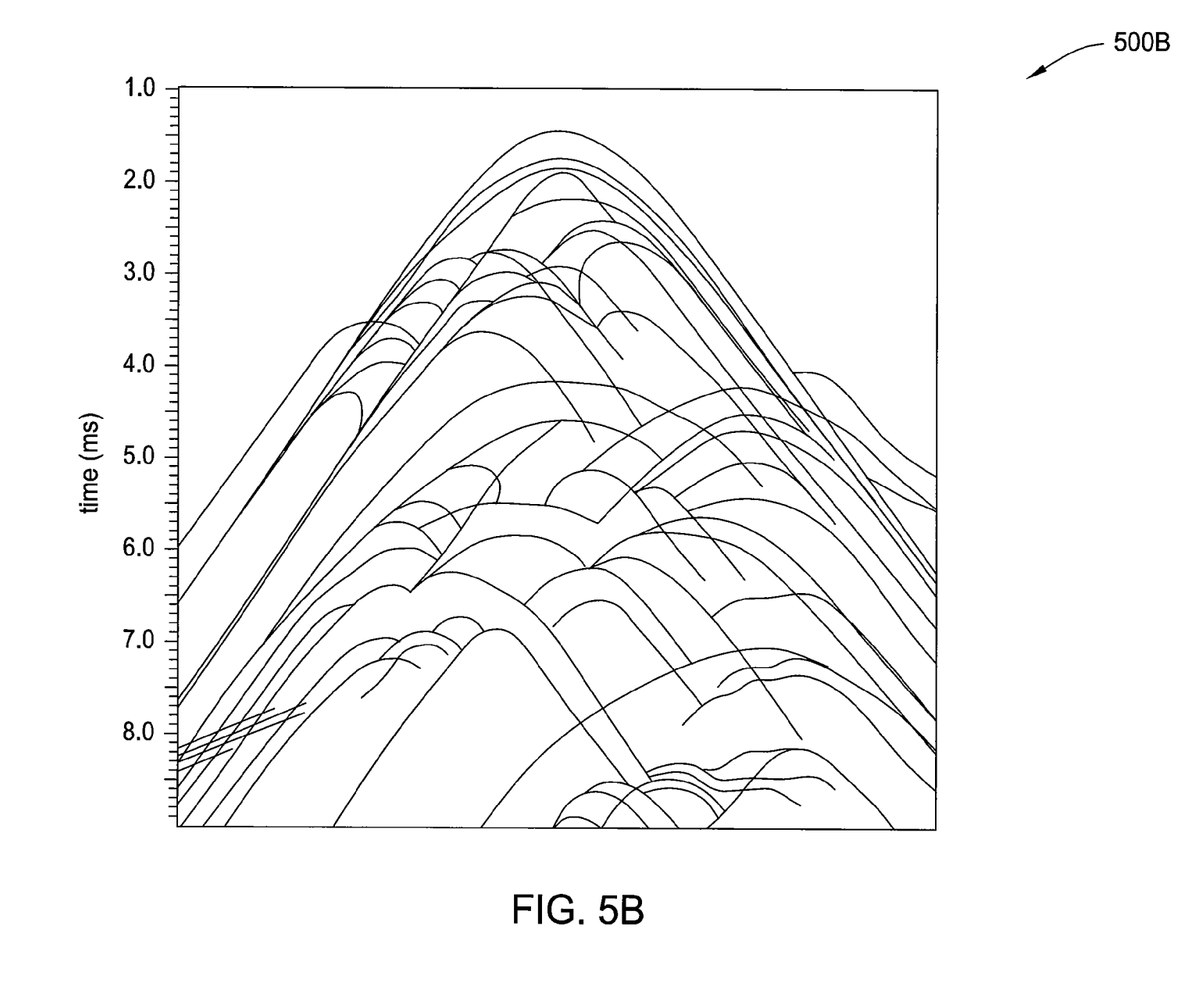
FIG. 5B illustrates the up-going wavefield of FIG. 5A after being corrected with the DTF of FIG. 2, in accordance with an embodiment of the present invention.

Likewise, FIG. 5B illustrates an up-going wavefield 500B from the dual-hydrophone configuration employed to generate FIG. 1 after being corrected with the DTF of FIG. 2. The up-going wavefield 500B does not exhibit the residual down-going energy 502.

As described above, any appropriate numerical analysis technique may be utilized to determine a suitable DTF for the closely spaced dual-hydrophone based on the zero-lag cross-correlation between up- and down-going energy after multiplying either the upper or lower hydrophone spectrum with a potential DTF. While an exhaustive search technique may check all possible DTFs and find the most accurate DTF based on a global minimum cross-correlation, other techniques (e.g., simulated annealing or a genetic algorithm) may sacrifice some accuracy for computational speed. Rather than search all possible DTFs, these techniques may try different DTFs until a threshold (e.g., a sum of cross-correlations value) acceptable for the application has been attained or a given computation budget (in terms of time, the number of processing steps, or memory allocation) has been reached. These much faster techniques are likely to achieve a solution that is close to the minimum (e.g., a local minimum), but may not be the absolute minimum (i.e., the global minimum).

While the foregoing is directed to embodiments of the present invention, other and further embodiments of the invention may be devised without departing from the basic scope thereof, and the scope thereof is determined by the claims that follow.

What is claimed is:

1. A method for determining a suitable differential transfer function (DTF) between first and second hydrophones, comprising:
  (a) determining a plurality of possible DTFs based on corresponding trace pairs from the first and second hydrophones;
  (b) generating a product by applying one of the plurality of possible DTFs to one trace of a portion of the trace pairs, the one trace being from the second hydrophone;
  (c) separating the product into an up-going component and a down-going component;
  (d) calculating a cross-correlation between absolute values of the up-going and down-going components;
  (e) repeating steps (b) through (d) for each trace pair in the portion of the trace pairs;
  (f) summing the cross-correlations for all the trace pairs in the portion of the trace pairs;
  (g) repeating steps (b) through (f) for each possible DTF in the plurality of possible DTFs; and
  (h) selecting the suitable DTF from the plurality of possible DTFs based on the summed cross-correlations.

2. The method of claim 1, wherein generating the product comprises multiplying a spectrum of the second hydrophone for the one trace of the portion of the trace pairs with the one of the plurality of possible DTFs to form the product.

3. The method of claim 1, wherein selecting the suitable DTF comprises selecting the suitable DTF as the possible DTF corresponding to the absolute minimum summed cross-correlation.

4. The method of claim 1, wherein selecting the suitable DTF comprises selecting the suitable DTF as one of the plurality of possible DTFs corresponding to a minimum summed cross-correlation.

5. The method of claim 1, wherein calculating the cross-correlation comprises calculating a zero-lag cross-correlation.

6. The method of claim 1, wherein the first hydrophone is an upper hydrophone and the second hydrophone is a lower hydrophone in a hydrophone pair.

7. The method of claim 1, wherein the first and second hydrophones are separated by a distance less than or equal to 1 m.

8. The method of claim 1, wherein the first and second hydrophones are disposed in a single housing.

9. The method of claim 1, wherein determining the plurality of possible DTFs comprises using a global optimization technique.

10. The method of claim 9, wherein the global optimization technique comprises at least one of exhaustive search, simulated annealing, and a genetic algorithm.

11. The method of claim 1, wherein separating the product comprises at least one of Fourier transformation, Radon transformation into the time-slowness (tau-P) domain, median filtering, optimal filtering, frequency-wavenumber (f-k) filtering, Karhunen-Loève (K-L) filtering, and parametric separation.

12. A computer-readable medium containing a program for determining a suitable differential transfer function (DTF) between first and second hydrophones, which, when executed by a processor, performs operations comprising:
   (a) determining a plurality of possible DTFs based on trace pairs from the first and second hydrophones;
   (b) generating a product by applying one of the plurality of possible DTFs to one trace of a portion of the trace pairs, the one trace being from the second hydrophone;
   (c) separating the product into an up-going component and a down-going component;
   (d) calculating a cross-correlation between absolute values of the up-going and down-going components;
   (e) repeating steps (b) through (d) for each trace pair in the portion of the trace pairs;
   (f) summing the cross-correlations for all the trace pairs in the portion of the trace pairs;
   (g) repeating steps (b) through (f) for each possible DTF in the plurality of possible DTFs; and
   (h) selecting the suitable DTF from the plurality of possible DTFs based on the summed cross-correlations.

13. The computer-readable medium of claim 12, wherein generating the product comprises multiplying a spectrum of the second hydrophone for the one trace of the portion of the trace pairs with the one of the plurality of possible DTFs to form the product.

14. The computer-readable medium of claim 12, wherein selecting the suitable DTF comprises selecting the suitable DTF as the possible DTF corresponding to the absolute minimum summed cross-correlation.

15. The computer-readable medium of claim 12, wherein the first hydrophone is an upper hydrophone, the second hydrophone is a lower hydrophone, and the upper and lower hydrophones are separated by a distance less than or equal to 1 m.

* * * * *